Figure 1:
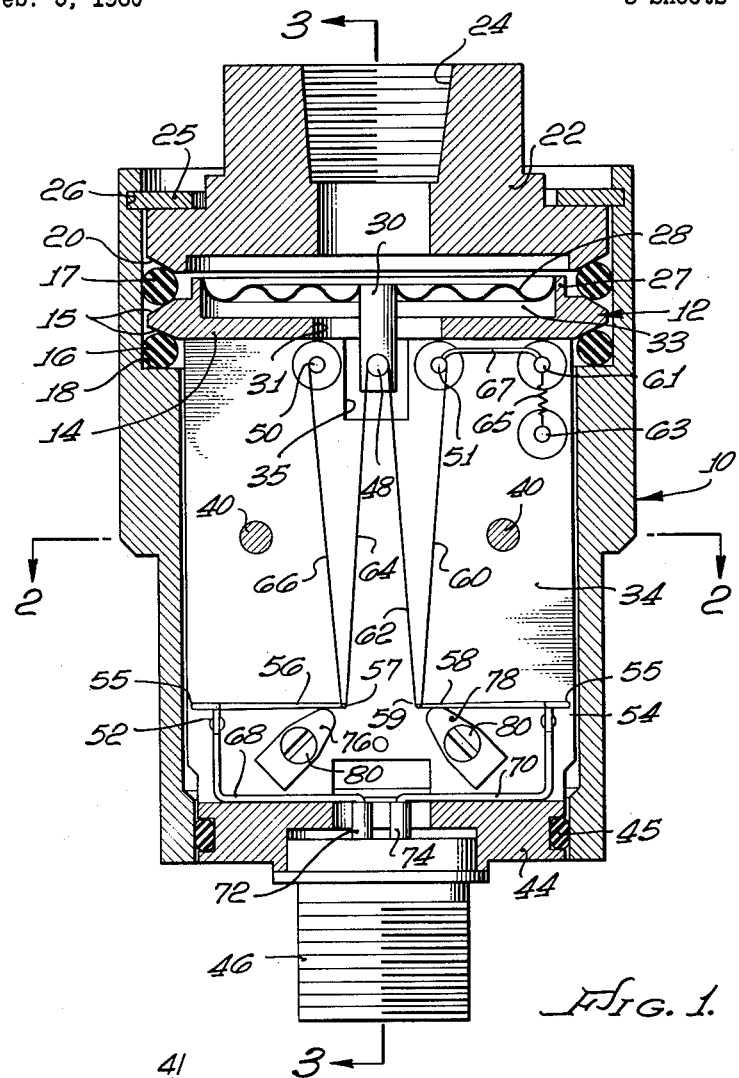

Oct. 16, 1962   L. D. STATHAM   3,058,348
TRANSDUCER
Filed Feb. 5, 1960   3 Sheets-Sheet 1

INVENTOR.
LOUIS D. STATHAM
BY Philip Subkow
Max Geldin
ATTORNEY.

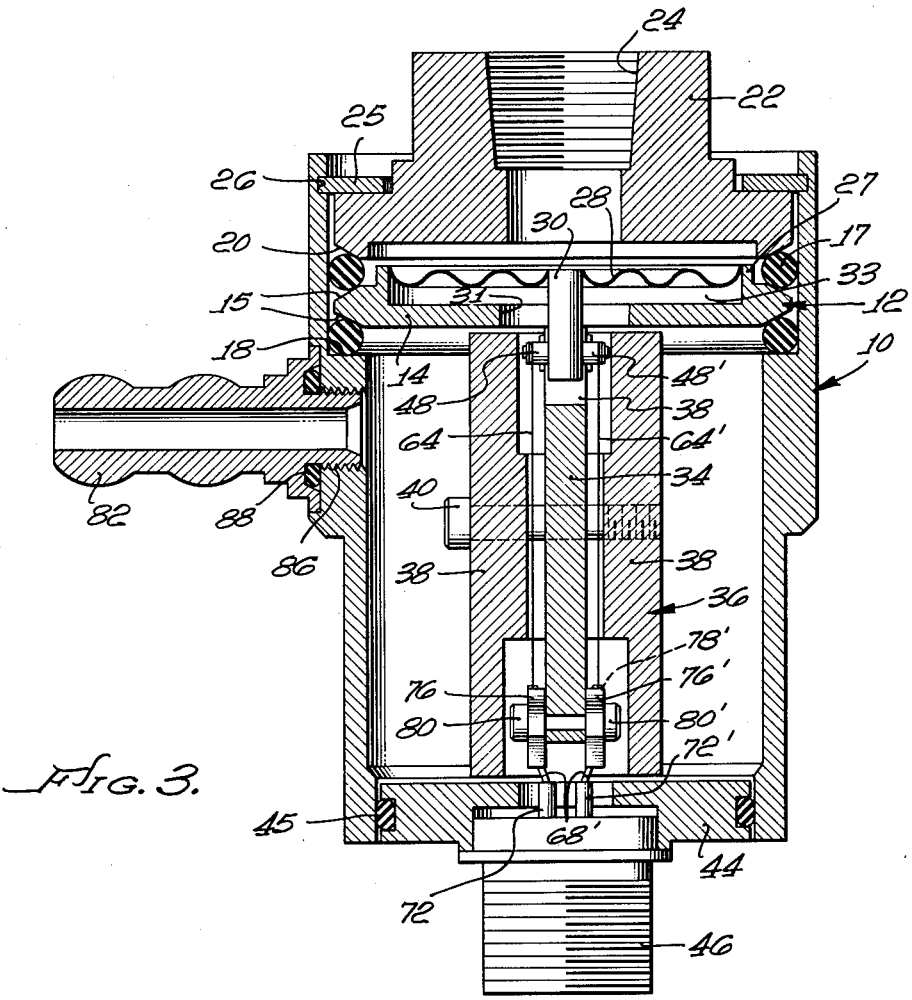

Oct. 16, 1962　　　L. D. STATHAM　　　3,058,348
TRANSDUCER
Filed Feb. 5, 1960　　　3 Sheets-Sheet 3

INVENTOR.
LOUIS D. STATHAM
BY
ATTORNEY.

3,058,348
TRANSDUCER
Louis D. Statham, Beverly Hills, Calif., assignor to Statham Instruments, Inc., Los Angeles, Calif., a corporation of California
Filed Feb. 5, 1960, Ser. No. 6,994
6 Claims. (Cl. 73—398)

This invention relates to an electrical strain wire transducer. Transducers in which a force summing means varies the tensile stress on the wire to cause a variation in the electrical resistance of the wire which is thus a measure of the motion of or of a force imposed on a force summing means are well known. The force summing means may be a rod, diaphragm, or weight, or any other member subject to motion in space as a result of forces or motions imposed thereon. The force summing means is the medium for summing up all the forces simultaneously applied to the force summing means and transmitting the same to the wire. When the force summing means is a rod, the transducer may be a displacement measuring device; where the force summing means is a diaphragm, the transducer may be a pressure gauge; and, where the force summing means is a weight, it may be an accelerometer, or velocitometer, as the case may be. The foregoing is intended as illustrative and not as exhaustive of the forms of force summing means and of the applications of strain wire transducers.

This application is a continuation-in-part of my copending applications Serial No. 605,098, filed August 20, 1956, now Patent No. 2,968,942, and Serial Nos. 714,141, now abandoned and 714,942, now Patent No. 2,947,962, both filed February 10, 1958, each of said applications being a continuation-in-part of application Serial No. 502,663, filed April 20, 1955, now Patent No. 2,760,037.

In the prior art form of unbonded strain wire transducers in which strain sensitive wires under tension are stretched between two points where longitudinal difference varies when one or both of the points are displaced in response to the motion of a force summing means, it has been necessary to connect the wires to terminals and the terminals to wire connectors so that the strain sensitive wires may be connected into an electrical bridge circuit for measurement of the change in resistance resulting from the variation in strains in the wires.

Several forms of such transducer are exemplified in this art. They are among those in which one end of the wire is connected to a point which does not move and the other to a force summing means so that this point moves on displacement of the force summing means. Such transducers are described for example in the Statham Patents 2,453,548, 2,453,549, 2,453,550, 2,720,113, 2,751,476 and 2,573,285, in which forms there are at least one wire which increases in tension while another decreases in tension on movement of the force summing means.

Forms of such device in which all the strain wires undergoing variation in stress are stretched between a stationary pin and a pin which moves in response to the movement of the force summing means. This is exemplified in the Statham Patent No. 2,751,746 and many others.

A second form of unbonded strain gage transducer in which the pins are mounted on a deformable structure so that the pins to which the ends of the wires are connected both move on displacement of the force summing means is illustrated by the Statham et al. Patent 2,600,701.

A third form of transducer in which a pair of wires are connected so that an end of each wire is connected to a yieldable constraint and the other end of each wire of the pair is connected so that when such ends are moved relative to each other on motion of the force summing means, one of the wires is increased in tension while the other is decreased in tension. Such transducers are exemplified in U.S. Patent 2,760,037.

In such systems the wire or wires undergoing variation in tension are conventionally made part of an electrical bridge which is balanced under zero conditions, i.e. at zero displacement of the force summing means. A wire in such bridge which varies in tension on transduction by the transducer of the force or displacement sensed, is termed an active arm of the bridge. Sometimes in such systems other balancing wires are employed to balance the bridge which do not vary in tension on transduction. These are termed inactive arms. In the more sophisticated form of such transducers four active arms are used to make up, with other inactive resistors, the Wheatstone bridge arrangement.

In all of the above units the wires are arranged so that back wiring is necessary in order to connect them in a Wheatstone bridge arrangement. That is, cross connections must be made within the gage to connect the wire terminals so that the wires undergoing reduction in tension are in opposite arms of the bridge. The nature of the backwiring necessary for the first type is illustrated in Carlson 2,059,549, Statham 2,455,883, 2,573,285, Baker 2,622,176, Epstein 2,697,158. See also characteristics and application of resistance strain gages, U.S. Department of Commerce, National Bureau of Standards, Circular 528, pp. 32, 33.

In the case of the backwiring required in the second type, see Statham 2,600,701. Backwiring for the third type is illustrated by Patent No. 2,760,037.

In all the above forms of transducers, each end of the wires which vary in tension must be connected to terminals and leads so that they may be connected into an electrical bridge. This requires wires connected to back ends of the structure on which the wire supports are located, resulting in considerable wiring as is shown in the above patents. The increased costs and hazards of improperly soldered connections increases the cost of construction due to the complexity of assembly and presents hazards of improper construction.

I have avoided much of the above complexities by the simple expedient of wiring the bridges so that there are at least eight active arms. In this way they may be connected into a Wheatstone bridge in such manner that all of the terminals are located at the same end of the structure on which the wire supports are mounted.

In a preferred embodiment four pairs of strain wires are employed, two pairs in one plane on one side of the instrument and two pairs in another plane in the other side of the instrument. A mounting member is provided between the two pairs of strain wires on each side of the instrument. The two pairs of strain wires on each side of the instrument have a common connection to the wire mounting which is attached at the upper end of the instrument to the force summing member, and each pair of such strain wires has a common connection to a yieldable member of spring. Thus there are four such yieldable members or springs, two on each side of the above noted mounting member. The eight strain wires are connected in a bridge circuit so that each strain wire is an active arm, with the wires of each pair of strain wires connected together at their common point of connection at a yieldable spring, such common point of connection being one corner of the bridge. The bridge is thus arranged so that the four yieldable constraining members or springs are the four terminals connected to the corners of the bridge, to which all the output leads are connected. Since all four yieldable members or springs are positioned at one end, e.g. the lower end, of the instrument, this greatly facilitates wiring of the instrument, and avoids backwiring to the upper wire mountings adjacent the force summing member.

Figure 2:
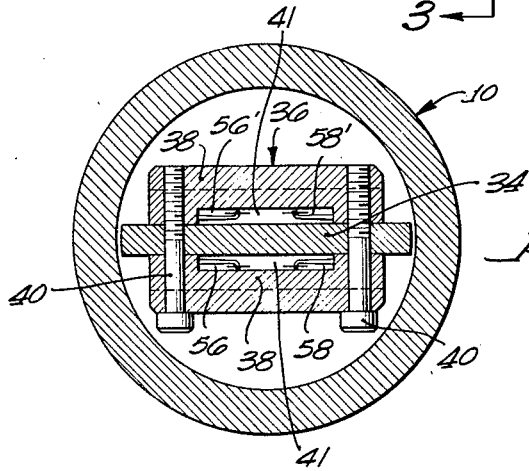
Figures 5, 6:
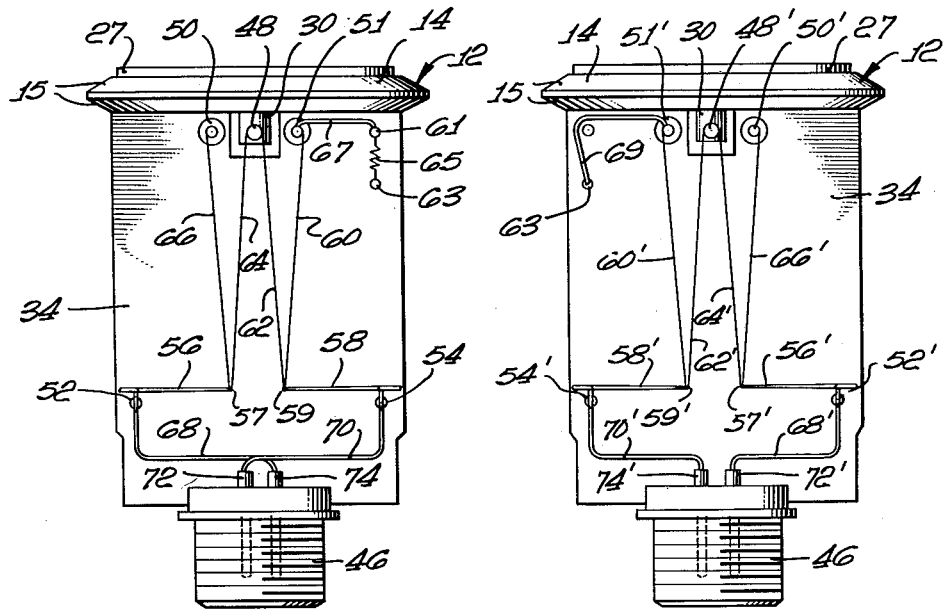
Figure 7:
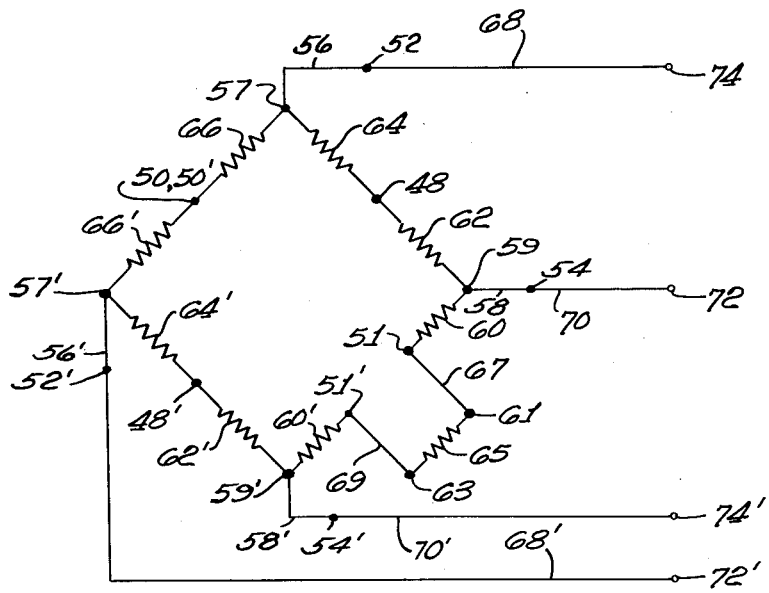

The invention will be more readily understood by reference to the description below of a preferred embodiment, employing four pairs of strain wires, taken in connection with the accompanying drawing wherein:

FIG. 1 is a vertical section of the instrument;
FIG. 2 is a section taken on line 2—2 of FIG. 1;
FIG. 3 is a section taken on line 3—3 of FIG. 1;
FIG. 4 is a detail of the spring construction;
FIG. 5 is an elevation of the frame showing the pins and two pairs of strain wires on one side of the frame;
FIG. 6 is an elevation of the opposite side of the frame, showing the pins and the other two pairs of strain wires on the other side of the instrument; and
FIG. 7 is a schematic illustration of the bridge circuit formed by the four pairs of strain wires shown in FIGS. 5 and 6.

Referring particularly to FIGS. 1 to 3 of the drawing, numeral 10 designates a case in which the instrument is contained. Within the case 10 there is supported a frame 12 having an upper cylindrical supporting member or plate 14 which is beveled along its outer periphery at 15. The beveled periphery 15 of the supporting member 14 is clamped between a pair of O-rings 16 and 17, O-ring 16 being seated on an internal horizontal shoulder 18 formed on the interior wall of the case 10, and O-ring 17 being positioned against the interior wall of the case 10 and abutting the beveled shoulder 20 of a pressure cap 22 which has a threaded pressure fluid inlet at 24. Cap 22 is maintained in position in the end of the case 10 by the snap ring 25 which seats within a groove 26 in the interior wall at the end of case 10.

The upper supporting member 14 of the frame 12 carries an upstanding lip 27 integral with member 14 adjacent the beveled peripheral portion 15 thereof. Across the lip 27 is supported a diaphragm 28 having connected to the central portion thereof and extending axially of the diaphragm a post or armature 30 which passes through an enlarged central aperture 31 in the adjacent plate or supporting member 14. It will be seen that the supporting of the diaphragm 28 on the peripheral lip 27 provides a space 33 between the diaphragm and member 14 to permit oscillation of the diaphragm without contacting plate 14.

Oppositely positioned plates 14 and 44 have integrally connected therewith diametrically across these plates a central block 34 which spaces said plates from each other. Block 34 has a central opening 35 in the upper end thereof, which receives the post 30 with sufficient clearance to permit free axial movement of the post in said opening, in response to oscillation of the diaphragm 28. A shield 36 formed of a pair of symmetrical half portions 38 having a U-shaped cross section as best seen in FIG. 2, are mounted on the vertical support plate 34, by means of the screws 40. Spaces 41 are provided between the shield portions 38 and supporting plate 34, such spaces being of sufficient width to receive the strain wires mounted on both sides of the plate 34 as shown in FIG. 3 and described more fully below, to permit freedom of displacement of the wires without contacting plate 34 or the shield portions 38. The cover plate 44 closes the other end of the instrument, O-ring 45 being provided between cover plate 44 carries an electrical outlet plug 46 of conventional design, e.g. a Cannon plug.

Referring now more particularly to FIGS. 1, 3, 5, and 6, a pin 48 is mounted on the post or armature 30, and there is mounted at the upper ends of block 34 a pair of wire connections or pins 50 and 51 on opposite sides and closely adjacent the pin 48. At the opposite outer ends of the vertical plate 34 are mounted a pair of terminals or conductive pins 52 and 54 which carry inwardly extending torsion springs 56 and 58 respectively. At the inner ends of springs 56 and 58 are respectively mounted terminals or conductive pins 57 and 59. It will be seen that pin 57 is offset axially between pins 48 and 50 and pin 59 is likewise offset axially between pins 48 and 51.

The construction of springs 56 and 58 is the same. Referring to FIG. 4 showing the construction of one of the springs 56, the end 55a of the spring is positioned in a groove 55b of the terminal, and the spring has a looped portion 55 bent back and extending over the pin 52, and an outwardly extending tapered portion 57' at the end ow which is mounted the wire connection 57.

A pair of electrical resistance strain wires 60 and 62 are mounted in tension on pins 48, 59 and 51, strain wire 60 being connected in tension between pins 51 and 59, and strain wire 62 connected in tension between pins 48 ad 59. A pair of strain wires 64 and 66 are similarly mounted on pins 48 and 50 and 57, strain wire 64 being stretched in tension between and mounted on pins 48 and 57, and strain wire 66 being stretched in tension between and mounted upon pins 50 and 57.

As is seen in FIG. 1, the pins 50 and 50' are positioned on one side and 51 and 51' on the other side of the wire supports 48 and 48' and in substantial alignment therewith, the wires of each pair of strain wires making substantially equal small acute angles with each other.

In a manner similar to that described above a pin and strain wire assembly exactly like that above described is mounted on the opposite side of the vertical plate 34 from the pin and wire assembly above described, with the corresponding pins on such opposite side of plate 34 being mounted directly in alignment with the pins above described, and the strain wires on such opposite side of plate 34 being in alignment with and parallel to the corresponding strain wires above described.

Thus, viewing FIG. 6 showing the pin and strain wire assembly on the opposite side of plate 34 from that above described, strain wire 64' is mounted in tension between pins 48' and 57' and strain wire 66' is mounted in tension between 50' and 57', pin 57' being mounted at the inner end of torsion spring 56'. Also strain wire 60' is mounted in tension between pins 51' and 59' and strain wire 62' is mounted in tension between pin 48' and pin 59', which is mounted at the inner end of the torsion spring 58'.

Springs 56, 58 and 56', 58' have a spring constant or stiffness less than the spring constant or stiffness of the strain wires.

Hence it is seen that the arrangement above described provides two pairs of strain wires 60, 62 and 64, 66 on one side of the plate 34, and two pairs of strain wires 60', 62' and 64', 66' on the other side of the plate 34, the two pairs of strain wires on opposite sides of 34 being mirror images of each other as noted in FIGS. 5 and 6.

An electrical resistance 65 is mounted on an insulator 61 connected to an outer corner portion of plate 34. An electrical lead 67 (see FIG. 5) is mounted between pins 51 and 61, connecting strain wire 60 and one end of resistance 65, and an electrical lead 69 (see FIG. 6) passing through aperture 63 in the plate 34 connects the other end of resistance 65 with strain wire 60' at pin 51' on the other side of plate 34. These pins provide means for introduction of an inactive trim resistor into one leg of the bridge. Such a resistor is shown at 65.

Referring now particularly to FIGS. 5, 6 and 7, it will be noted that the strain wires described above are connected to form a bridge circuit. Electrical leads 68, 70 and 68', 70' connect terminals 52, 54 and 52', 54' with terminals 74, 72 and 74', 72' in the plug 46, for connection in an external circuit to complete the bridge circuit. Tracing out this circuit it will be seen that pin 57 constituting one of the corner terminals of the bridge is connected via the spring 56 and pin 52 to the terminal pin 74. The corner pin 57 is connected to the strain wire 64, in turn connected to terminal or pin 48. Terminal 48 is then connected to strain wire 62, which is connected to corner pin 59, the latter in turn being connected via spring 58 to the terminal pin 54. Corner terminal 59 is connected to the strain wire 60, which is connected to terminal 51, and the terminal 51 is connected via lead 67 to the trim resistor 65, in turn connected via lead 69 to pin 51' on the other side of the plate 34. Pin 51' is then connected via the strain wire 60' to the corner terminal 59', which is connected via spring 58' to the terminal pin 54'. Terminal 59' is then connected to the strain wire 62' and then to pin 48', and pin 48' in turn is connected to the strain wire 64', connected to the corner terminal 57', which is connected via the spring 56' to terminal pin 52'. To complete the circuit, corner pin 57' is connected to strain wire 66', which is connected at its opposite end to pin 50'. Pin 50' is electrically connected to pin 50, and pin 50 is connected to strain wire 66, which is connected at its opposite end to corner pin 57.

It will thus be noted that the corner pins 57, 59, 57' and 59' of the bridge, connected to the springs 56, 58, 56' and 58', respectively, are all positioned at one end of the transducer, and the terminals 52, 54, 52' and 54' are all located at one end of the transducer and may be connected to the corners of the bridge through the springs. Hence, no backwiring is required to connect the various strain wires in the bridge circuit, as is required in the prior art.

Also it will be seen that each of the four legs of the Wheatstone bridge is formed of two wires from two different pairs of the strain wires, electrically connected in one leg of the bridge. Thus referring to FIG. 7, one leg of the bridge is formed of wire 62 of the pair of strain wires 60 and 62, electrically connected at 48 to one of the strain wires 64 of the pair of strain wires 64 and 66; another leg of the bridge is formed of strain wire 66 of one pair of strain wires 64 and 66, electrically connected at 50, 50' to one of the strain wires 66' of the pair of strain wires 64' and 66'; a third leg of the bridge is formed by one of the strain wires 64' of the pair of strain wires 64 and 64', electrically connected at 48' to a strain wire 62' of another pair of strain wires 60' and 62'; and the fourth leg of the bridge is formed of strain wire 60' of the pair of strain wires 60', 62', electrically connected via lead 69, resistor 65 and lead 67 to a strain wire 60 of another pair of strain wires 60, 62.

To clarify the terminology employed in certain of the claims, and referring particularly to FIG. 5, pins 48, 57, 59, 50 and 51 constitute first, second, third, fourth and fifth wire connections or pins, respectively; springs 56 and 58 constitute first and second yieldable constraining means or springs, respectively; strain wires 64, 66, 62, 60 constitute first, second third and fourth strain wires, respectively; pins 52 and 54 constitute first and second terminals, respectively. Further, referring particularly to FIG. 6, pins 48', 59', 57' 51' and 50' constitute sixth, seventh, eighth, ninth and tenth wire connections or pins, respectively; springs 58' and 56' constitute third and fourth yieldable constraining means or springs, respectively, strain wires 62', 60', 64', 66' constitute fifth, sixth, seventh and eighth strain wires, respectively; and pins 52' and 54' constitute third and fourth terminals, respectively.

A pair of adjustable stops 76 and 78 are positioned closely adjacent the springs 56 and 58, such stops being mounted on plate 34 by means of the screws 80. Likewise, on the opposite side of plate 34 another pair of adjustable stops 76' and 78' are mounted adjacent the springs 56' and 58' by means of the screws 80'. The stops can be rotated on their pivots 80 or 80' to adjust their position with respect to springs 56, 58 and 56', 58'. These stops are positioned against each of the adjacent springs 76, 78, 76', 78' prior to winding of the strain wires on their supports or pins, to place an initial tension of these springs in an upward direction, viewing FIG. 1. When the wires have been wound, the stops are backed off the springs, causing the springs to retract and placing an initial tension on the strain wires. The stops are then adjusted adjacent the respective springs to prevent undue oscillation of the springs and avoid danger of possible rupture of the strain wires in the event of sudden shock in an axial direction of the instrument or of diaphragm 28.

Mounted in a side of the case 10 is a pressure connection 82 which is threadably connected at 86 to the wall of case 10, employing an O-ring seal 88 between 82 and the outer wall of the case. This pressure connection is for the purpose of applying pressure fluid to the interior of case 10 and against the underside of diaphragm 28, viewing FIG. 3, so that the transducer can be employed as a differential pressure transducer.

It will thus be seen that if pressure is applied through the pressure inlet against the diaphragm 28 and such pressure is greater than the pressure applied to the underside of the diaphragm by the fluid entering inlet 82, the diaphragm will move downwardly as viewed in FIGS. 1 and 3, and the post or armature 30 will be displaced axially downward carrying the pins 48 and 48' with the post 30. Since pins 50, 51 and 50', 51' are fixed, and since pins 57, 59 and 57', 59' are mounted at the ends of the springs 56, 58 and 56', 58', such displacement of the pins 48 and 48' will cause a decrease in tension in strain wires 62 and 64 and an increase in tension in strain wires 60 and 66, and similarly there will be produced a corresponding decrease in tension in strain wires 62' and 64' and a corresponding increase in tension in strain wires 60' and 66'. This change in tension in the various strain wires as described above produces corresponding changes in resistance in the strain wires, causing an output from the bridge which is proportional to such resistance changes and hence proportional to the displacement of the post or armature 30 and the force producing such displacement.

If desired, the instrument can be operated so that the pressure on the underside of the diaphragm is ambient pressure.

Also, the instrument can be operated at negative pressures, that is, when the pressure of the fluid introduced via inlet 24 is less than the pressure introduced via inlet 82. In this case the diaphragm 28 will be displaced upwardly, viewing FIG. 1, carrying armature 30 and pins 48 and 48' therewith. This motion of armature 30 produces an increase in tension in strain wires 62, 64 and 62', 64', and a decrease in tension in strain wires 60, 66 and 60', 66', resulting in a corresponding change in strain in these wires, and an output from the bridge proportional to the changes in strain of the wires and the displacement of armature 30.

Further, it will be seen that the pins and the strain wires mounted thereon are suspended within the case and out of contact with the interior walls thereof by reason of the above described structure wherein the plate 14 which carries the pin and strain wire assembly rests on the O-rings 16 and 17 so that the frame on which the pins and strain wires are mounted in effect floats within the case. This permits considerable ease of assembly simply by inserting the frame carrying the plate 14, the diaphragm 28, the suspended plate 34, the pin and strain wire assembly, and the attached cap 44 and plug 46 into the case from the upper end thereof, and then inserting the pressure cap 22 and the snap ring 24 to maintain the strain assembly in fixed position in the case. Considering members 14, 34 and 44 to constitute the frame of the device, only the outer periphery of member 14 is fixedly connected to the case or housing 10 by means of the O-rings 16 and 17, member 22 and the snap ring 25. The frame member 44 is not directly connected to the case but is free to be displaced with respect to the case as result of the sliding O-ring seal 45. Thus, the frame member 34 on which the strain wire transducer structure is mounted, is in strain isolated relationship from the case, since the frame is only connected to the case at a localized area of the case adjacent O-rings 16 and 17, and the frame is spaced from the case at all other areas of the frame and is disconnected from the case throughout such other areas. It will be noted that the force summing means including diaphragm 28 on which post 30 is mounted, is also connected to the housing, via member 14, at the above noted localized area of the case adjacent O-rings 16 and 17. Hence, any changes in dimension of the case 10, e.g. due to changes in ambient temperature or shock, are not transmitted to the frame member 34 carrying the strain wires, or to the strain wires themselves, and hence do not adversely affect the response of the instrument.

It will be understood that instead of employing the principles of the invention in a pressure gage as above described I can employ instead of the diaphragm 28 a rod which is connected to the post 30 to measure displacement of the rod or I can mount a weight on the diaphragm or on an equivalent resilient member which is connected to the post 30, such instrument then being an accelerometer.

Further, instead of employing springs such as 56, 58, 56', 58' as the yieldable constraint for the strain wires, I can employ any other form of yieldable constraint such as a magnet or weight attached to the converging ends of each pair of strain wires, as above described.

Although I have shown pins 50, 51, 52, 54 and the pins 50', 51', 52', and 54' connected to member 34 carried on frame 12', it will be understood that such pins can be mounted in any desired manner on the case.

From the foregoing it is seen that I have provided a much simplified form of transducer as compared to instruments of this nature described in my above mentioned patents and copending applications, particularly with respect to the wiring of the instrument.

While I have described a particular embodiment of my invention for the purpose of illustration, it should be understood that various modifications and adptations thereof may be made within the spirit of the invention as set forth in the appended claims.

I claim:

1. An electrical strain wire transducer comprising a force summing means, a transducer structure having a first wire support connected to said force summing means, a second wire support connected to said force summing means, said first and second wire supports being mounted adjacent one end of said transducer, a first pair of yieldable constraining members positioned opposite said first wire support, a second pair of yieldable constraining members positioned opposite said second wire support, said constraining members being mounted adjacent the other end of said transducer, a first pair of electrical resistance strain wires having a common connection to one of said constraining members of said first pair of constraining members, a second pair of electrical resistance strain wires having a common connection to the other constraining member of said first pair of constraining members, adjacent strain wires of said first and second pairs of strain wires having a common connection to said first wire support, a third pair of electrical resistance strain wires having a common connection to one of said constraining members of said second pair of constraining members, a fourth pair of electrical resistance strain wires having a common connection to the other constraining member of said second pair of constraining members, adjacent strain wires of said third and fourth pairs of strain wires having a common connection to said second wire support, a terminal connected to each of said common connections on said constraining members, electrical connections connected to each of said terminals, said first and second pairs of strain wires being mounted in a plane parallel to and spaced from said third and fourth pairs of strain wires, a housing for said transducer structure including a case and a frame, means mounting said frame in said case in strain isolated relationship from said case by connecting said frame to said case at a localized area of said case with said frame being spaced from said case at all other areas of said frame and being disconnected from said case throughout said other areas, said force summing means being connected to said case adjacent said localized area, means mounting said transducer structure on a portion of said frame removed from said localized area and at an area of said transducer structure spaced from said force summing means, whereby on application of a force to said force summing means, said force summing means moves with respect to said case.

2. An electrical strain wire transducer comprising a force summing means, a wire support connected to said force summing means, a frame, four wire supports on said frame, four pairs of strain wires, four yieldable constraining means positioned on said frame spaced from said supports on said frame and on said force summing means, a strain wire support on each of said constraining means, each pair of said wires being connected to a support on said constraining means, one of the wires of each pair connected to the support on said force summing means and the other of the wires of each pair connected to one of the supports on said frame, said wires of each pair extending in tension at an acute angle to each other between said supports on said frame and said force summing means and the support on the constraining means, said supports on said frame and on said force summing means being in substantial alignment, the tension of the wires of each pair varying in opposite direction, one increasing while the other decreases in tension on movement of said force summing means, said four pairs of strain wires electrically connected and forming four legs of a Wheatstone bridge arrangement, each of the four legs of the bridge being formed of two electrically connected strain wires whose tension vary in the same direction and on movement of said force summing means, said last mentioned wires being each from a different pair of said four pairs and the said four legs being electrically connected at said supports on said constraining means, and forming the four corners of said Wheatstone bridge.

3. In the strain wire transducer of claim 2, a case enclosing said frame, four terminals positioned in said case adjacent said constraining means, each of said terminals electrically connected to a pair of wires on a constraining means.

4. An electrical strain wire transducer comprising a case having mounted therein a movable force summing member, a wire support connected to said force summing member, four yieldable constraining members mounted in said case opposite said wire support, a first pair of electrical resistance strain wires having a common wire mounting on one of said constraining members, a second pair of electrical resistance strain wires having a common wire mounting on a second constraining member, a strain wire of each of said first and second pairs of strain wires having a connection to said wire support, a third pair of electrical resistance strain wires having a common wire mounting on a third constraining member, a fourth pair of electrical resistance strain wires having a common wire mounting on the fourth constraining member, a strain wire of each of said third and fourth pairs of strain wires having a connection to said wire support, and means for displacing said wire support with respect to said constraining members, a strain wire of each of said four pairs of strain wires having a fixed connection and means for electrically connecting said wires into a Wheatstone bridge arrangement with two wires from different pairs of wires being electrically connected to form a leg of said Wheatstone bridge, means for electrically connecting said wires mounted on said wire mountings on said constraining means to the corners of said bridge, a case enclosing said frame, four terminals positioned in said case at one end of said case, and an electrical connection between each of said terminals and one of said corners.

5. A strain wire transducer comprising a case, a frame comprising a supporting plate, said plate having a peripheral edge, an upstanding lip on said plate adjacent said peripheral edge, a diaphragm connected on said lip, a plate depending from said supporting plate, means to seal said supporting plate at said peripheral edge at one end of said case, a motion transmitting rod connected to said diaphragm, a pair of wire supporting pins mounted on and insulated from said rod, and extending on both sides of said rod and said depending plate, a pair of aligned pins mounted on each side of said depending plate adjacent to and in alignment with said pins on said rod, two springs mounted on one side of said depending plate and two springs mounted on the other side of said depending plate, a wire support mounted on each of said springs, in substantial alignment and spaced from the pins on said rod and the pins adjacent thereto on said depending plate, four pairs of electrical resistance strain wires, one of the wires of each pair stretched in tension between one of the pins on said rod, and the wire support on one of said springs, the second one of the strain wires of said pair stretched in tension between said pin on said spring, and one of said pins on said depending plate adjacent the pins on said rod, the wires of each pair making equal acute angles with each other, apexed at said supports on said springs, terminals mounted in said case at the other end of said case, an electrical connection between one of said terminals and said wires mounted on said supports on one of said springs, and an electrical connection for connecting said wires into a Wheatstone bridge, each leg of said Wheatstone bridge composed of two wires from two different pairs.

6. A strain wire transducer comprising a case, a frame in said case, a force summing means, a plurality of wire mountings in said case, four pairs of electrical resistance strain wires on said mountings, said wires stretched in tension between said mountings, a motion transmitting connection between said force summing means and certain of said wire mountings, whereby on movement of said force summing means the tension in one of the wires of each pair varies in a direction opposite to the variation in tension of the other wire of said pair, means for electrically connecting said wires into a Wheatstone bridge arrangement, said means comprising means for electrically connecting in series one of the wires of a pair to a wire of another pair, said last mentioned wires varying in tension in the same direction, to form each one of the four legs of the Wheatstone bridge, said means for electrically connecting the legs of said Wheatstone bridge including means to form the four corners of said bridge, four terminals positioned in said case adjacent one end of said case, said four terminals being positioned in said case adjacent to said four corners of the bridge, and means electrically connecting the four corners of said bridge to said four terminals.

References Cited in the file of this patent

UNITED STATES PATENTS

| | | |
|---|---|---|
| 2,059,549 | Carlson | Nov. 3, 1936 |
| 2,760,037 | Statham | Aug. 21, 1956 |
| 2,913,693 | Yaotili | Nov. 17, 1959 |